Feb. 13, 1945.  R. T. FIELDS  2,369,553
EXTRUSION APPARATUS
Filed April 29, 1943   2 Sheets-Sheet 1

REUBEN T. FIELDS
INVENTOR

BY Lynn Barratt Morris
ATTORNEY

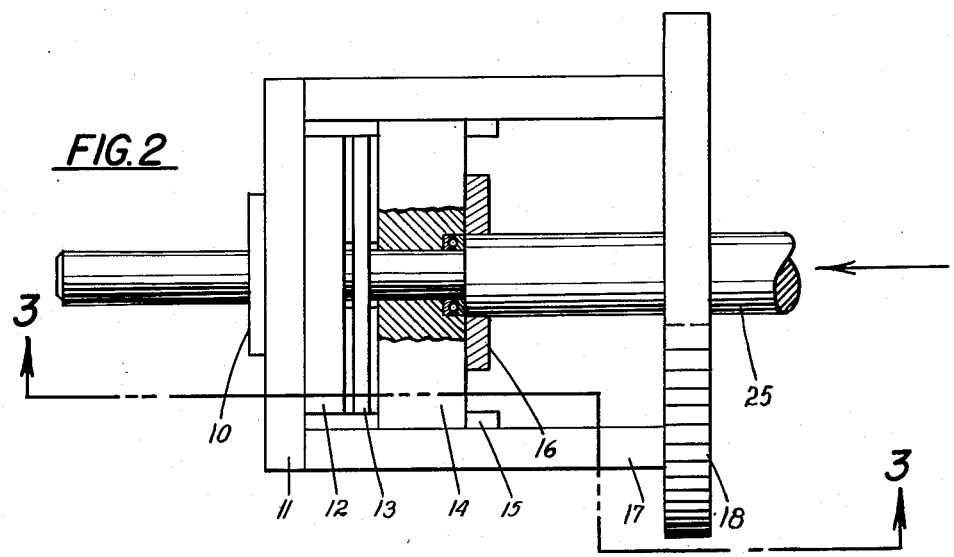
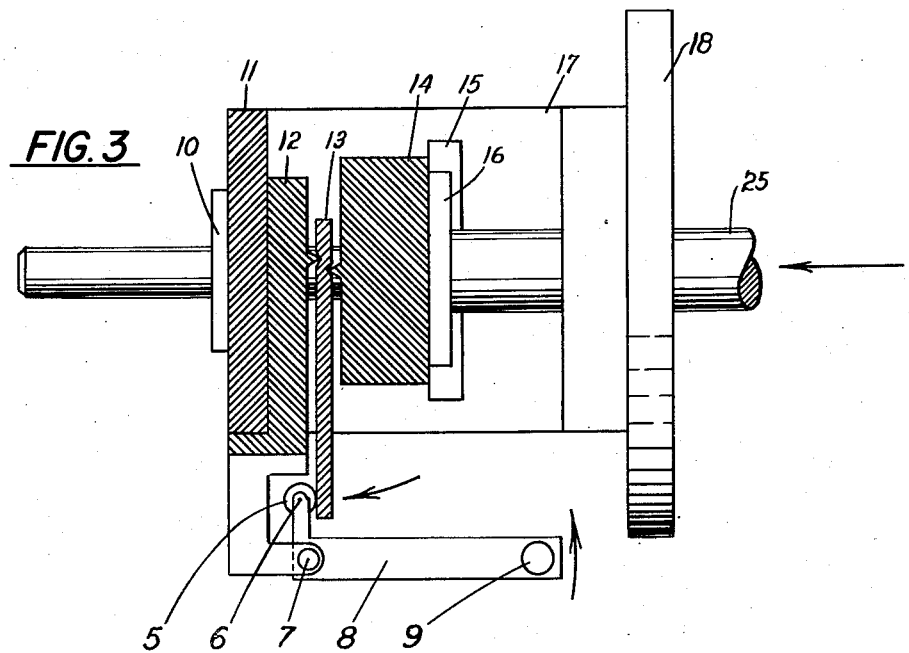

Patented Feb. 13, 1945

2,369,553

UNITED STATES PATENT OFFICE 2,369,553

EXTRUSION APPARATUS

Reuben T. Fields, Arlington, N. J., assignor to E. I. du Pont de Nemours & Company, Wilmington, Del., a corporation of Delaware Application April 29, 1943, Serial No. 485,027

5 Claims. (Cl. 18—8)

This invention relates to the extrusion of plastic materials. More particularly it relates to the measurement and control of the pressure developed during such extrusion. Still more particularly it relates to the manufacture of filaments by the extrusion of molten organic polymeric materials by means of a screw pump and to the measurement and control of the pressure developed therein. Still more particularly it relates to an apparatus and process for controlling the extrusion of synthetic linear filament-forming polyamides and filaments.

The extrusion of plastic materials and particularly of molten synthetic linear polymers in the manufacture of filaments has presented difficult control problems to the art. This is because the pressure developed in the screw pump build up and cause rupture of the spinneret unless the process is very carefully controlled. Pressure gauges have been used as described in U. S. P. 2,295,942. The pressure gauges thereof employ a diaphragm to keep the molten polymer out of the line to the gauge. Because of the high temperatures required to maintain the polymers in the molten condition, it has been difficult to obtain a suitable liquid for use in the line from the gauge to the diaphragm. It has been found that the average life of such diaphragms is approximately one week with the most suitable liquid found. It is thus obvious that such a method for the measurement of pressure is not feasible for continuous plant production.

It has been proposed to measure the power used to drive the screw in such extrusion operations. This measurement, however, does not provide the necessary information as to the pressure developed on the polymer delivered to the spinneret when a large portion of the power is used for internal shearing of the melt. A minor amount of the power produces the actual pressure on the filament. It has been found that a power meter is not sufficiently sensitive to determine when a pressure has developed sufficient to ruin the spinneret or spinneret cup.

The use of shear pins has also been proposed. They do not provide adequate protection against excessive pressure and have other disadvantages.

It is an object of this invention to provide a process for measuring the pressure developed in the extrusion of plastic materials. A more specific object is to provide a process for measuring and controlling the pressure developed in a screw pump used to extrude molten synthetic linear polymers to a spinneret in the spinning of filaments. A further object is to provide a device which is sensitive to the pressure developed in the screw pump and will prevent injury to the spinneret. A still further object is to provide a system for measuring the pressure developed in such a screw pump which is of simple and durable construction. A still further object is to provide such a system wherein the pressure present during an extrusion operation can be visually determined. A still further object is to provide means for stopping the action of a screw pump in the spinning of molten synthetic linear polymers before pressure is developed which would damage the spinning equipment.

The above objects are accomplished according to the present invention by providing a screw pump with means for indicating the pressure on the system and for stopping the screw pump when excessive pressures develop.

In a more limited sense they are accomplished by providing a screw pump for delivering molten synthetic polymers to a spinneret with a control means operatively associated with the thrust of the screw pump so that an increase in the thrust operates to measure the thrust developed and to stop the screw pump in the event the pressure exceeds a previously determined figure.

In a practical aspect of the invention, the shaft of the screw pump at the end opposite the extrusion orifice or spinneret is provided with a thrust bearing. The bearing is operatively associated with a fulcrum which bears against a lever which is also in contact with a separate fulcrum on the opposite side thereon and which is held in a fixed position. The thrust on the screw-pump shaft is transmitted through the thrust bearing to the first fulcrum and in turn to the lever. The lever in turn is operatively connected to a pressure-measuring device. The latter is provided with means for visually determining the thrust of the screw pump and thereby the pressure at the extrusion orifice. It is further provided with means for terminating the action of the screw pump should excessive pressures develop.

The invention will be more fully illustrated by reference to the accompanying drawings wherein identical reference numerals are used to indicate similar parts throughout the several views. In the drawings:

The Figure 1 is an elevation of a suitable apparatus with parts shown in section of a practical screw pump and its control means. The control and indicating means is somewhat diagrammatic;

Figure 2 is a plan view in greater detail of the thrust bearing and its associated mechanism;

Figure 3 is a vertical section along the lines 3—3 of Figure 2.

Figure 1:
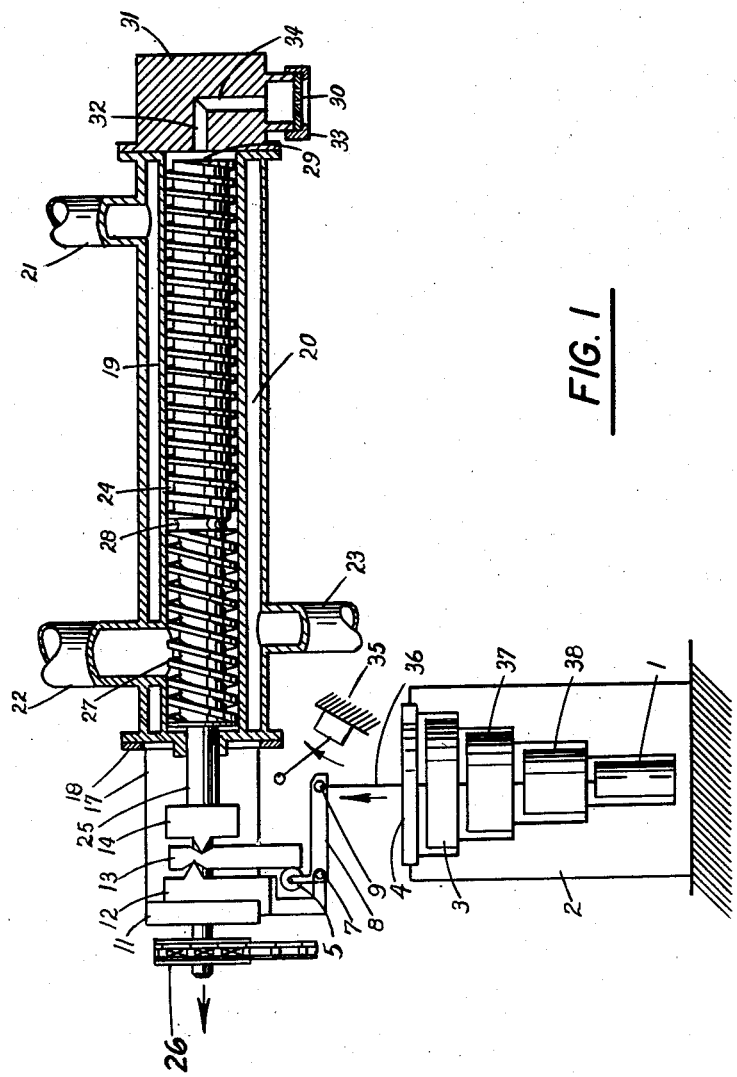

Referring to the drawings, a plastic material, such as a synthetic linear condensation polymer in plastic or liquid condition, flows into the screw pump by inlet 22. The screw casing 19 is maintained at a temperature sufficient to keep the polymer molten by means of a heat exchange fluid circulated through the inlet 23 into the jacket 20 and out through the outlet 21. A motor, not shown, may be used to drive shaft 25 of the screw through the chain 26. This motor is wired to switch 35 so that it operates only when the lever arm is in the down position.

In the casing 19, rotation of the screw member 24, having flutes 27 and 28, serves to convey molten polymer from the inlet 22 to the discharge end 29 which communicates, through channels 32 and 34, with the block 31 attached to the casing 19 to the spinneret 30 through which the molten polymer is extruded to form filaments and the like. The spinneret 30 is held to block 31 by means of cap 33.

The space between the channel 34 and the spinneret 30 may be filled with finely-divided inert solid material, e. g., fine sand (not shown). The sand and spinneret offer considerable resistance to the flow of the plastic material, that is, molten polymer, so that pressure is built up at the end 29 of the screw. This pressure is transmitted by the screw 24 through the screw shaft 25 to a thrust-bearing assembly 14, which is free to move longitudinally in the direction of the arrow (Fig. 1) from the normal position of the screw and back to the normal position of the screw but is prevented from moving laterally in the direction opposite to the arrow beyond the normal position of the screw by the fixed bars 15 (Figs. 2 and 3) and is also prevented from turning by side bars 17, and these side bars are rigidly attached to frame plate 18, which in turn is bolted to casing 19 of the screw pump. The thrust-bearing assembly is shown schematically. It may comprise, however, an opening in a block substantially the same diameter of shaft 25, which shaft is reduced in the opening to form a shoulder, which shoulder abuts against an outer annular race of a thrust ball bearing comprising two annular races with ball bearings therebetween. The reduced portion of the shaft may then extend through the block as shown in Figures 2 and 3.

A cover plate 16 is provided to keep dirt from the antifriction bearing in assembly 14. A similar cover plate 10 can be used to keep dirt from a shaft bearing mounted on frame plate 11. The latter may be welded to side bars 17 or bolted thereto. A knife-edged fulcrum on bearing assembly 14 bears against a lever plate 13 and transmits its thrust to the latter. The plate 13 may have a V-shaped recess to admit the knife edge of the fulcrum. The plate may be supported from the frame 11 by means of a knife-edged fulcrum on plate 12. The lower edge of plate 12 carries a lever 8 comprising two arms which are disposed at right angles. The short vertical arm is provided with a roller 5 mounted on a pin 6. Arm 8 is rotatably mounted on pin 7 attached to frame 11. At the end of horizontal arm of lever 8 is provided means 9 for attaching a flexible element such as cable 36 which is attached to weight 1 and serves to lift weights 38, 37, 3, and 4 successively through which said element passes from support 2 as the pressure built up by the screw is transmitted by the shaft thereof to the thrust-bearing assembly to the lever system causing arm 8 to pivot on pin 7 thereby elevating the end of arm 8.

By observing the weights, the approximate thrust pressure on the screw pump can be determined. An increase in pressure will serve to lift successively the weights from the support. By observing the number of weights which are raised above their support ledges, a measure of the pressure developed in the screw can be visually determined.

In the event that the pressure becomes excessive, there would be a marked thrust on the shaft which in turn would elevate the end of arm 8 to a sufficient degree to more than elevate all the weights and trip switch 35, thus stopping the operation of the motor and the screws.

In a practical embodiment, the vertical distance from the knife-edged fulcrum on thrust-bearing assembly 14 to the knife-edged fulcrum on plate 12 may be 0.100 inch, and from the knife-edged fulcrum on plate 12 to the roller 5, 3.6 inches so that the thrust exerted against 5 is $1/35$ of the thrust transmitted from the screw by shaft 25. The vertical distance from the roller 5 to pin 7 is $7/16$ inches, and the horizontal distance from the pin 7 to the point of application of the weight at 9 is 4 inches. The thrust exerted against the weight is then $1/315$ of the thrust developed by the screw.

In a specific process of extruding a polyamide filament, such as polyhexamethylene adipamide, it has been found that the initial pressure developed by the screw in extruding the filament through the sand and spinneret is approximately 600 pounds per square inch. With the size weights used, weights 1, 38, and 37 are picked up from their supports. As the extrusion proceeds, the pressure required to force the molten polymer through the sand zone and spinneret increases. After four hours of operation, the pressure is 800 pounds per square inch, and the weight 3 is also lifted from its support. After ten hours of operation, the foreign material collected in the sand zone above the spinneret raises the pressure to 1,000 pounds per square inch whereby all of the weights are raised from the support 2. After eleven hours of operation, the end of arm 8 raises still further and opens switch 35 which stops the motor and operation of the screw pump. The spinneret may then be removed, new sand put in, and the spinneret replaced. Spinning may then be resumed.

Should unusual pressures develop in the operation of the system and the pressures developed do not follow a schedule such as that just described, the operator can tell at a glance from observing the position of weights the pressures developed in the system at any time. Should the pressures become excessive, he could then increase the temperature in the jacket of the screw pump to make the polyamide flow with greater ease. Should the sand zone or spinneret become clogged, pressures would develop immediately enabling the operator to tell something is wrong whereby adjustment could be made in the extrusion procedure. Should excessive pressures develop, the operation of the screw pump could be stopped without breaking the spinneret which would cause considerable difficulty in commercial extrusion operations.

The invention is useful in the extrusion of plastic materials in general. It is particularly adapted for the extrusion of synthetic linear condensation polymers, such as filament-forming polyamides. Suitable polymers which can be extruded into filaments are described in U. S. Patents 2,071,250; 2,071,253; 2,130,948.

The filament-forming polymeric materials used may also contain modifying agents, e. g., luster-modifying agents, plasticizers, pigments, dyes, anti-oxidants, resins, etc.

The invention provides a method and an apparatus whereby plastic materials and particularly organic filament-forming compounds and compositions comprising them can be spun into coarse filaments of uniform diameter free from bubbles and discoloration.

Moreover, by the invention there is provided a simple means for the measurement and controlling of the pressure developed by a screw pump which obviates difficulties involved in using a diaphragm-type pressure gauge. The present system is more effective and makes feasible the commercial extrusion of molten polymers of high melting points into filaments.

As many apparently widely different embodiments of this invention may be made without departing from the spirit and scope thereof, it is to be understood that I do not limit myself to the specific embodiments thereof except as defined in the appended claims.

I claim:

1. In an extrusion apparatus comprising a casing and a screw rotatable therein for discharging a plastic from one end of said casing and capable of limited axial movement relative to said casing, means responsive to the thrust of said screw comprising a thrust bearing assembly through which the shaft of said screw passes, said thrust bearing assembly being provided with a fulcrum and said thrust bearing assembly and said shaft being mounted in fixed relation to each other with respect to movement parallel to the longitudinal axis of said shaft in the direction away from the discharge end of said casing, a frame mounted in fixed relation to said casing and also provided with a fulcrum, a lever pivoted on said fulcrums and adapted to be moved by movement of said shaft parallel to its longitudinal axis, and means associated with said lever and actuated by movement thereof for indicating the pressure developed at the discharge end of said casing.

2. In an extrusion apparatus comprising a horizontally disposed casing and a screw rotatable therein for discharging a plastic from one end of said casing and capable of limited axial movement relative to said casing, means responsive to the thrust of said screw comprising a thrust bearing assembly through which the shaft of said screw passes, said thrust bearing assembly being provided with a fulcrum and said thrust bearing assembly and said shaft being mounted in fixed relation to each other with respect to movement parallel to the longitudinal axis of said shaft in the direction away from the discharge end of said casing, a frame mounted in fixed relation to said casing and also provided with a fulcrum, a lever pivoted adjacent one of its ends on said fulcrums and extending downwardly in substantially vertical position in the absence of pressure on said screw, said lever being adapted to be moved out of said vertical position by movement of said shaft parallel to its longitudinal axis, and means associated with said lever and actuated by movement thereof for indicating the pressure developed at the discharge end of said casing.

3. In an extrusion apparatus comprising a casing and a screw rotatable therein for discharging a plastic from one end of said casing and capable of limited axial movement relative to said casing, means responsive to the thrust of said screw comprising a thrust bearing assembly through which the shaft of said screw passes, said thrust bearing assembly being provided with a fulcrum and said thrust bearing assembly and said shaft being mounted in fixed relation to each other with respect to movement parallel to the longitudinal axis of said shaft in the direction away from the discharge end of said casing, a frame mounted in fixed relation to said casing and also provided with a fulcrum, a lever pivoted on said fulcrums and adapted to be moved by movement of said shaft parallel to its longitudinal axis, a bent lever associated with said first lever and adapted to be actuated by movement thereof, a series of weights separately mounted in vertical juxtaposition on a fixed support, and an elongated member attached to the bottom weight, passing through the rest of the weights, and attached to said bent lever whereby movement of said bent lever raises and lowers said weights, the degree of movement of said bent lever determining the number of weights moved.

4. In an extrusion apparatus comprising a casing and a screw rotatable therein for discharging a plastic from one end of said casing and capable of limited axial movement relative to said casing, means responsive to the thrust of said screw comprising a thrust bearing assembly through which the shaft of said screw passes, said thrust bearing assembly being provided with a fulcrum and said thrust bearing assembly and said shaft being mounted in fixed relation to each other with respect to movement parallel to the longitudinal axis of said shaft in the direction away from the discharge end of said casing, a frame mounted in fixed relation to said casing and also provided with a fulcrum, a lever pivoted on said fulcrums and adapted to be moved by movement of said shaft parallel to its longitudinal axis, a bent lever associated with said first lever and adapted to be actuated by movement thereof, and a switch controlling the rotation of said screw and actuated by movement of said bent lever.

5. In an extrusion apparatus comprising a casing and a screw rotatable therein for discharging a plastic from one end of said casing and capable of limited axial movement relative to said casing, means responsive to the thrust of said screw comprising a thrust bearing assembly through which the shaft of said screw passes, a thrust bearing positioned in said thrust bearing assembly and comprising two annular races and ball bearings between said races, a shoulder on said screw shaft abutting against said thrust bearing, said thrust bearing assembly being provided with a fulcrum and said thrust bearing assembly and said shaft being mounted in fixed relation to each other with respect to movement parallel to the longitudinal axis of said shaft in the direction away from the discharge end of said casing, a frame mounted in fixed relation to said casing and also provided with a fulcrum, a lever pivoted on said fulcrums and adapted to be moved by movement of said shaft parallel to its longitudinal axis, and means associated with said lever and actuated by movement thereof for indicating the pressure developed at the discharge end of said casing.

REUBEN T. FIELDS.